US010551608B2

(12) United States Patent
Chan et al.

(10) Patent No.: US 10,551,608 B2
(45) Date of Patent: Feb. 4, 2020

(54) IMAGING SYSTEM WITH ANCILLARY IMAGE DETECTOR FOR SAMPLE LOCATION

(71) Applicant: Molecular Devices, LLC, Sunnyvale, CA (US)

(72) Inventors: Matthew Chan, Palo Alto, CA (US); Avrum Isaac Cohen, Downingtown, PA (US)

(73) Assignee: Molecular Devices, LLC, San Jose, CA (US)

( * ) Notice: Subject to any disclaimer, the term of this patent is extended or adjusted under 35 U.S.C. 154(b) by 319 days.

(21) Appl. No.: 15/079,495

(22) Filed: Mar. 24, 2016

(65) Prior Publication Data

US 2017/0276924 A1    Sep. 28, 2017

(51) Int. Cl.
*G02B 21/26* (2006.01)
*G02B 21/36* (2006.01)

(52) U.S. Cl.
CPC ........... *G02B 21/365* (2013.01); *G02B 21/26* (2013.01)

(58) Field of Classification Search
CPC ...... G02B 21/365; G02B 21/06; G02B 21/26; G02B 21/368
USPC .......................................................... 348/79
See application file for complete search history.

(56) References Cited

U.S. PATENT DOCUMENTS

| 5,822,055 | A  | * | 10/1998 | Tsai | G01N 21/8806 356/237.1 |
| 6,718,057 | B1 | * | 4/2004  | Mori | G06T 7/73 250/491.1 |
| 6,847,392 | B1 | * | 1/2005  | House | H04N 13/025 348/140 |
| 2002/0024668 | A1 | * | 2/2002 | Stehle | G01N 21/211 356/369 |
| 2007/0103675 | A1 | * | 5/2007 | Vodanovic | G01B 11/0608 356/237.1 |

(Continued)

FOREIGN PATENT DOCUMENTS

| EP | 1372013 A1 | 12/2003 |
| JP | 11-337320 A | 12/1999 |
| JP | 2005234306 A | 9/2005 |

OTHER PUBLICATIONS

Alonso et al., "Feeling the forces: atomic force microscopy in cell biology"; Elsevier Life Sciences, vol. 72, Issue 23, Apr. 25, 2003, pp. 2553-2560 (Year: 2003).*

(Continued)

*Primary Examiner* — Christopher G Findley

(57) ABSTRACT

Imaging systems and methods using an ancillary image detector for sample location. An exemplary system may comprise a light source to irradiate a sample on an irradiation axis, a first image detector on an optical axis oblique to the irradiation axis, and a stage. The system also may comprise a second image detector disposed on an imaging axis, and a drive mechanism configured to move the stage and the imaging axis relative to one another. The system further may comprise a processor configured to (a) receive an image of the sample detected by the first image detector, (b) determine a physical location for a region of contrast produced by the sample within the image, and (c) send a signal to the drive mechanism based on the physical location, to dispose at least part of the sample in a field of view of the second image detector.

20 Claims, 11 Drawing Sheets

(56) References Cited

U.S. PATENT DOCUMENTS

| | | | | |
|---|---|---|---|---|
| 2008/0117413 A1* | 5/2008 | Liphardt | ............... | G01N 21/211 |
| | | | | 356/73 |
| 2010/0060729 A1 | 3/2010 | Wetzel et al. | | |
| 2011/0115897 A1 | 5/2011 | Najmabadi et al. | | |
| 2012/0044486 A1* | 2/2012 | Chen | ....................... | H01L 22/12 |
| | | | | 356/237.5 |
| 2015/0082498 A1* | 3/2015 | Meyer | .................... | G01Q 30/02 |
| | | | | 850/1 |

OTHER PUBLICATIONS

International Search Report and Written Opinion for PCT/US2017/023300 dated Jun. 23, 2017.

\* cited by examiner

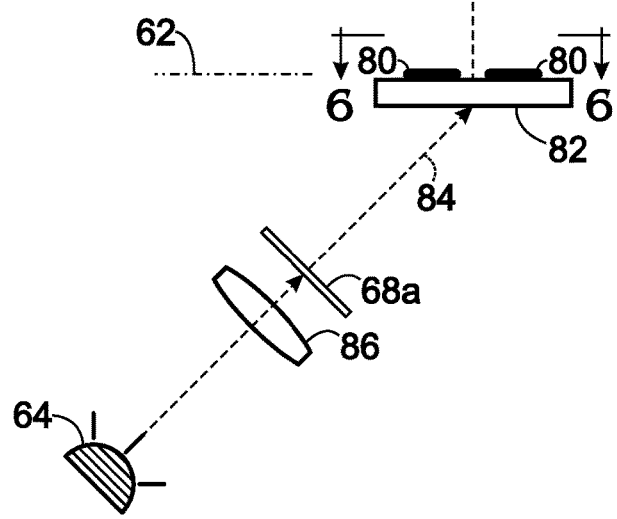
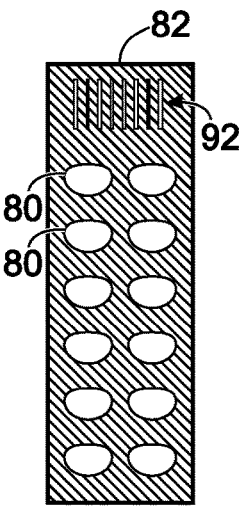
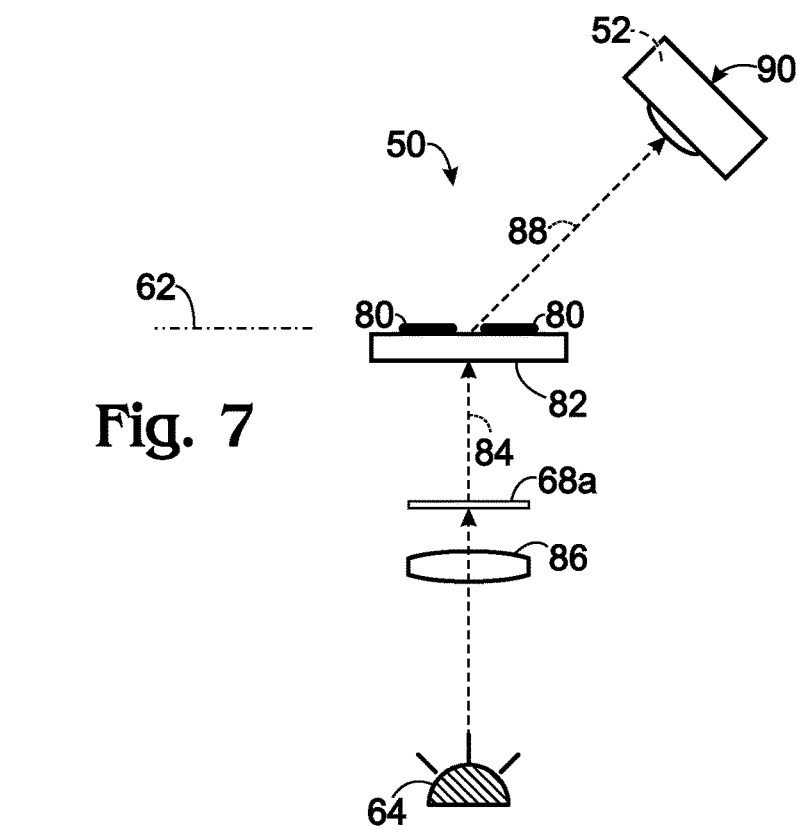

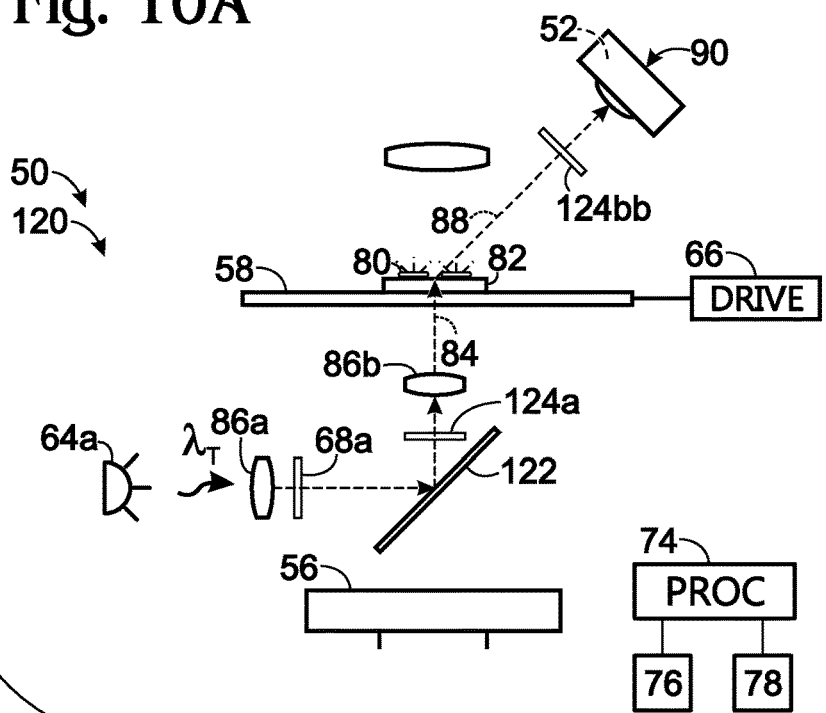
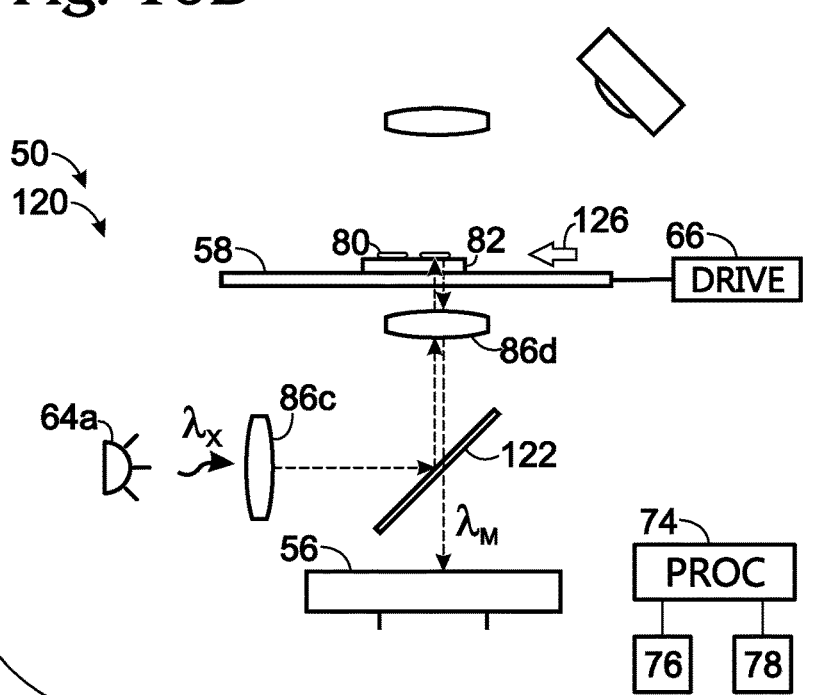

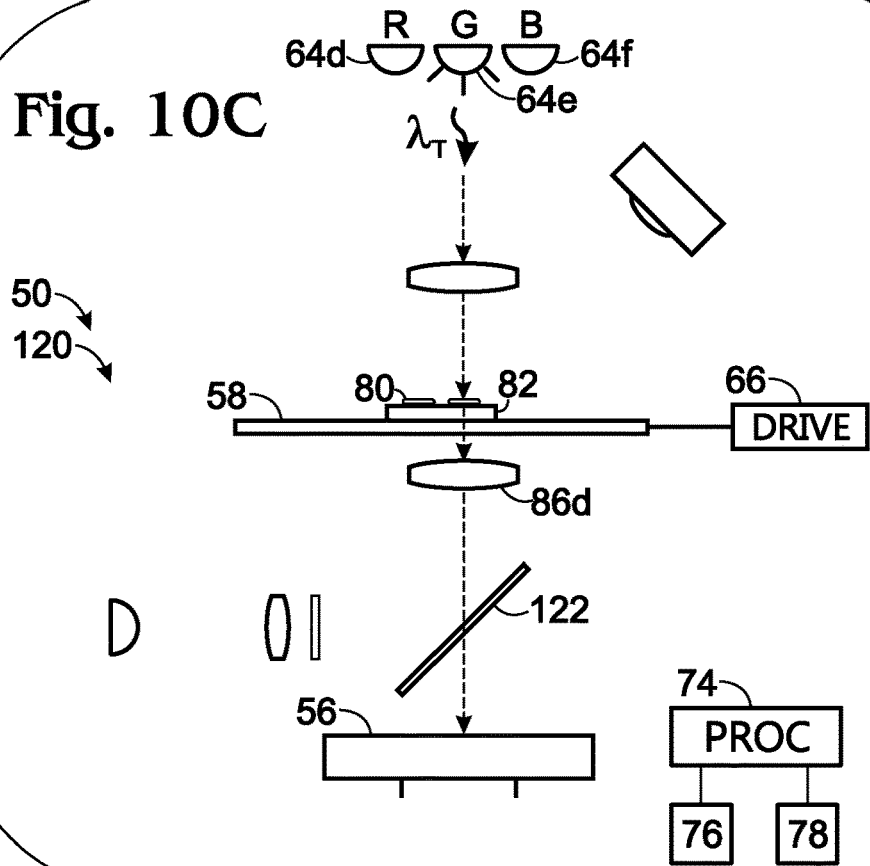
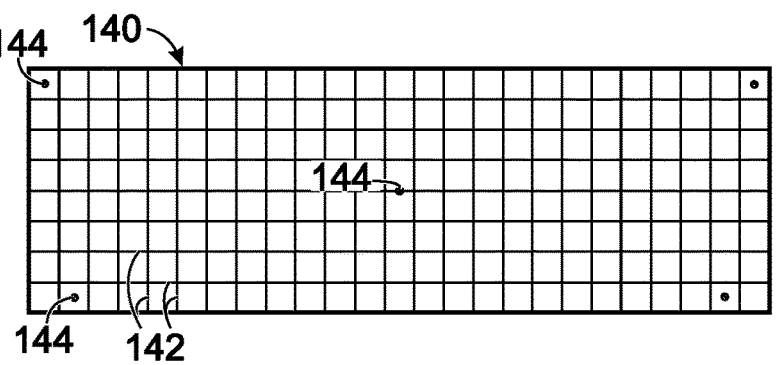
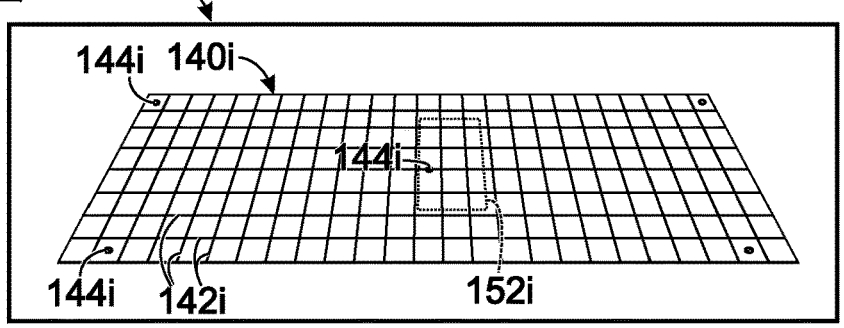

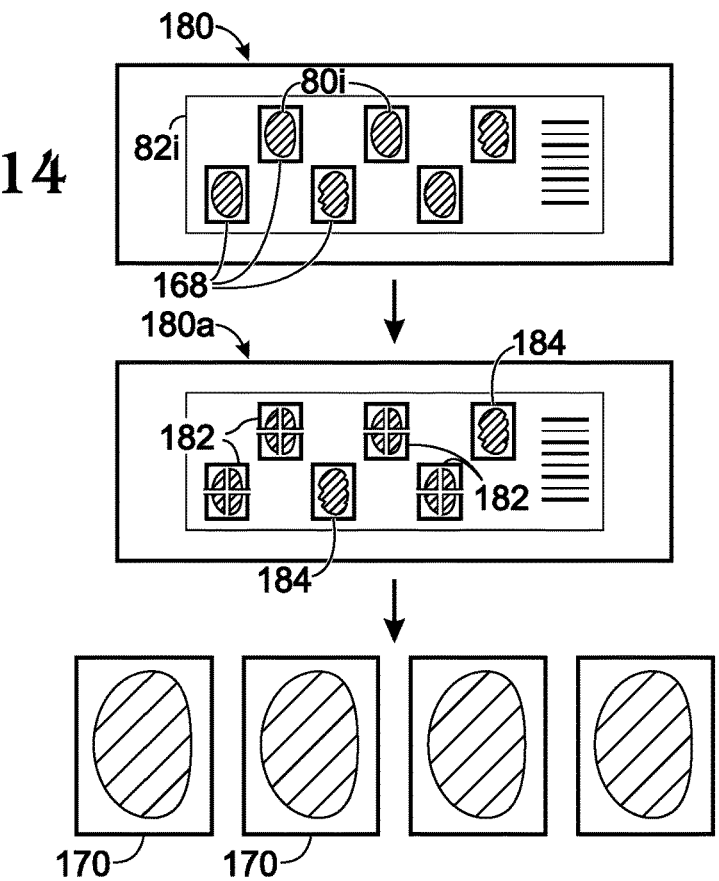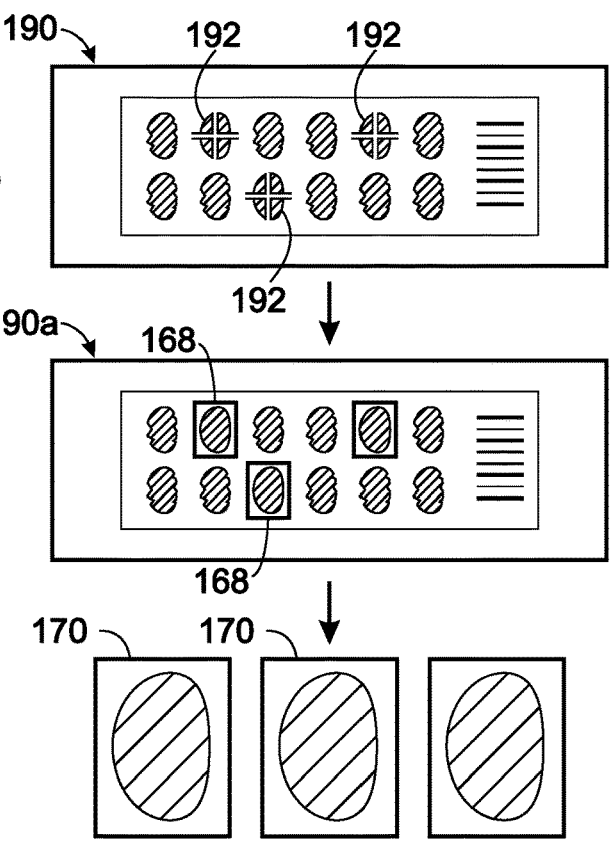

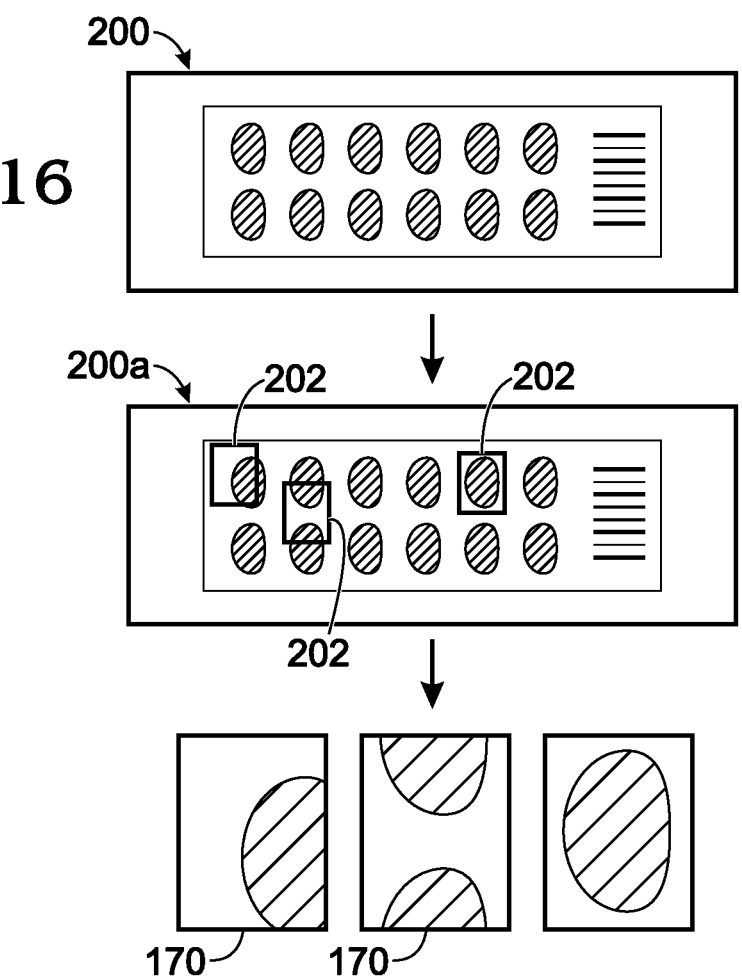

IMAGING SYSTEM WITH ANCILLARY IMAGE DETECTOR FOR SAMPLE LOCATION

INTRODUCTION

Tissue samples can be prepared as a series of thin sections arrayed on a slide for examination with a microscope. The microscope may be equipped with a digital imager and image processing software to automate aspects of image collection and analysis. However, the tissue samples can be difficult to locate on the slide because they are often arranged in an irregular array and have positions that vary from slide to slide. Hunting for the samples thus often becomes a bottleneck. The entire slide may be scanned systematically with the microscope but the field of view is typically small; many images must be collected to find the samples. For example, with a magnification often used for tissue imaging, each image can represent less than 1% of the sample-supporting area of the slide. Accordingly, over 100 images would need to be collected and processed to scan the entire sample-supporting area of the slide.

SUMMARY

The present disclosure provides imaging systems and methods using an ancillary image detector for sample location. An exemplary system may comprise a light source to irradiate a sample on an irradiation axis, a first image detector on an optical axis oblique to the irradiation axis, and a stage. The system also may comprise a second image detector disposed on an imaging axis, and a drive mechanism configured to move the stage and the imaging axis relative to one another. The system further may comprise a processor configured to (a) receive an image of the sample detected by the first image detector, (b) determine a physical location for a region of contrast produced by the sample within the image, and (c) send a signal to the drive mechanism based on the physical location, to dispose at least part of the sample in a field of view of the second image detector.

BRIEF DESCRIPTION OF THE DRAWINGS

FIG. 5 is another schematic view of the location imaging configuration of FIG. 2, except taken with samples that have been treated with a stain, in accordance with aspects of the present disclosure.

FIG. 6 is a plan view of a slide supporting the stained samples in FIG. 5 while the slide and samples are irradiated obliquely, taken generally along line 6-6 of FIG. 5, and schematically illustrating optical contrast between the samples and the slide due to more absorbance by the samples.

FIG. 7 is another schematic view of the location imaging configuration of FIG. 4, taken with samples that have been stained, in accordance with aspects of the present disclosure.

FIGS. 10A-C are schematic views of an exemplary embodiment of the microscope imaging system of FIG. 1 operating respectively in a location mode, an epi-illumination content mode, and a trans-illumination content mode, in accordance with aspects of the present disclosure.

FIG. 11 is a plan view of any exemplary calibration slide having reference marks for use in calibrating the location imager of FIG. 1, in accordance with aspects of the present disclosure.

FIG. 12 is an exemplary calibration image of the calibration slide of FIG. 11 that may be detected obliquely with the location imager of FIG. 1, in accordance with aspects of the present disclosure.

FIG. 14 is a schematic representation of another exemplary set of steps that may be performed by the microscope imaging system of FIG. 1, including autonomously processing a location image to locate samples, receiving user input to select samples of interest in the location image, and autonomously imaging the selected samples with a content imager of the system, in accordance with aspects of the present disclosure.

FIG. 15 is a schematic representation of yet another exemplary set of steps that may be performed by the microscope imaging system of FIG. 1, including receiving user input that generally indicates image regions of interest in a location image, autonomously locating a sample in each image region, and autonomously imaging the located samples with a content imager of the system, in accordance with aspects of the present disclosure.

FIG. 16 is a schematic representation of still another exemplary set of steps that may be performed by the microscope imaging system of FIG. 1, including receiving user input to define image areas of a content image, and autonomously imaging the defined image areas with a content imager of the system, in accordance with aspects of the present disclosure.

DETAILED DESCRIPTION

The present disclosure provides imaging systems and methods using an ancillary image detector for sample location. An exemplary system may comprise a light source to irradiate a sample on an irradiation axis, a first image detector disposed on an optical axis that is oblique to the irradiation axis, and a stage. The system also may comprise a second image detector disposed on an imaging axis, and a drive mechanism configured to move the stage and the imaging axis relative to one another. The system further may comprise a processor configured to (a) receive an image of the sample detected by the first image detector, (b) determine a physical location for a region of contrast produced by the sample within the image, and (c) send a signal to the drive mechanism based on the physical location, to dispose at least part of the sample in a field of view of the second image detector.

The microscope imaging systems disclosed herein may offer various advantages for imaging samples, such as tissue sections, having variable/unknown positions on a sample holder, such as a slide. These advantages may include any combination of the following. The samples may be located first with lower magnification imaging using an ancillary imager (a location image detector), and then imaged for content at higher magnification using a primary imager (a content image detector). The difference in magnification between the two imagers may be a factor of at least about 2, 5, or 10, among others, and the magnification of the primary imager may be adjustable manually and/or automatically by a processor. The system may be partially or completely automated without generating large amounts of unwanted image data. Accordingly, a user may review collected images more quickly. Sample throughput may be increased. In some embodiments, the same light source may illuminate the sample for location imaging and content imaging. Such an illumination scheme may be introduced without interfering with the functionality of the microscope or reducing reliability.

Further aspects of the present disclosure are described in the following sections: (I) overview of microscope imaging systems, (II) optical configurations for location imaging, (III) imaging system with a pair of imaging stations, (IV) imaging system embodiment, (V) methods of processing location images, and (VI) examples.

I. Overview of Microscope Imaging Systems

Figure 1:
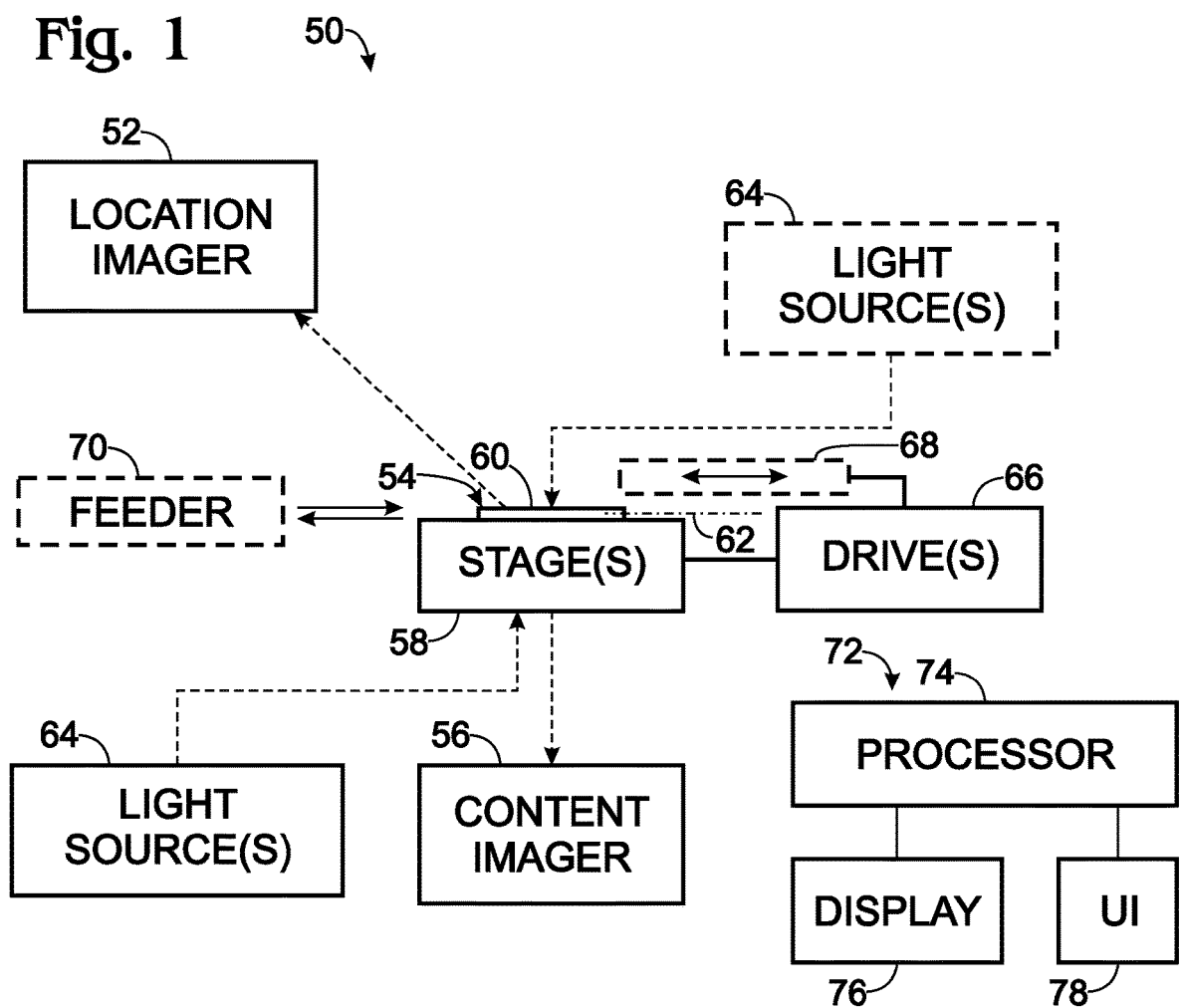
FIG. 1 is a schematic view an exemplary microscope imaging system having a location imager for imaging samples (e.g., tissue sections), to enable locating the samples for further imaging with a content imager of the system, in accordance with aspects of the present disclosure.

This section provides an overview of an exemplary microscope imaging system 50 having a location imager 52 for locating samples 54 at lower magnification (location imaging) and a content imager 56 to collect sample images of interest at higher magnification (content imaging); see FIG. 1.

System 50 is depicted with boxes and dashed arrows. Boxes formed with solid lines represent portions of the system that are more typically included, although not necessarily required, while those formed with dashed lines are optional in various embodiments. The dashed arrows represent optical axes followed by light to or from samples 54. Each optical axis may follow a single line or may, for example, follow two or more different lines (e.g., if folded by a mirror(s)). The term "light," as used herein, may include optical radiation of any suitable wavelength. Accordingly, light may be visible radiation, ultraviolet radiation, infrared radiation, or any combination thereof.

System 50 has at least one stage 58 to support a sample holder 60, which, in turn, contains or otherwise holds one or more samples 54. The samples may be supported by stage 58 and sample holder 60 in an examination region of a specimen plane 62 (also called a sample plane), which is parallel to and optionally close to an xy plane (a horizontal plane) defined by the system (e.g., by the stage). In some embodiments, the system may have at least two stages disposed in different imaging stations (e.g., see Section III).

Imagers 52 and 56 interchangeably may be termed image detectors or image detection devices. Imager 52 (and/or 56) also may be described as a camera, which is a discrete, removable module having integrated optics, and, optionally, an integrated focusing mechanism. The camera may be an external camera located outside the system housing. Each imager may image samples 54 while the samples are held in the specimen plane. The imagers may be disposed on opposite sides of specimen plane 62 (i.e., with location imager 52 above the plane and content imager 56 below the plane, or vice versa), or may be disposed on the same side of specimen plane 62 (i.e., with both imagers above the plane or both imagers below the plane). Imager 52 may be arranged (with the optional assistance of operatively associated optics) to detect location images in a plane oblique or orthogonal to an optical axis extending from the samples to the imager, to conduct respective oblique or parallel imaging (see Section II). In oblique imaging, the image plane of the imager is operatively oblique to the specimen plane. Imager 56 alternatively may be arranged (with the optional assistance of operatively associated optics) to conduct parallel imaging (i.e., with the image plane operatively parallel to the specimen plane).

Each imager (52 or 56) may be a grayscale (monochrome) image detector or a color image detector. A grayscale image detector detects grayscale images, where each image pixel carries only intensity information, while a color image detector detects color images in which each image pixel carries intensity and wavelength/color information (e.g., three intensities for three respective wavelengths/colors). The imager may be any device for collecting images of a sample or examination region. Exemplary image detectors are array detectors, such as charge-coupled device (CCD) sensors, active pixel sensors (e.g., complementary metal-oxide-semiconductor (CMOS) sensors, N-type metal-oxide-semiconductor (NMOS) sensors, etc.), or the like.

Imager 52 may be calibrated (e.g., by the manufacturer or user) before its use with samples, such that the pixels in each location image detected by image 52 are already mapped to points in the specimen plane (e.g., using an xy coordinate system defined by a fixed part of the imaging system). The same type of calibration also may be performed with imager 56, which allows the fields of view of the imagers to be correlated with one another. With this correlation, the system can calculate the physical offset in the specimen plane of any given pixel in a location image from a desired position (e.g., centered) in a content image. Further aspects of calibration imager 52 and processing of location images are described below in Section V.

The system has at least one light source 64 to irradiate samples 54 with light. The terms "irradiate" and "illuminate" and corresponding derivatives thereof have the same meaning and are used interchangeably in the present disclosure.

Each light source 64 (with the optional assistance of operatively associated optics) may be configured to irradiate at least a portion of one or more samples 54 from below or above specimen plane 62. The light source may be disposed below or above the specimen plane. In some embodiments, the system may be configured to irradiate at least a portion of one or more samples 54 from below the specimen plane with light originating from at least one light source 64, and from above the specimen plane with light originating from at least one other light source 64. Each light source 64 may irradiate samples 54 orthogonally or obliquely to specimen plane 62. In some embodiments, the same light source may be configured to irradiate samples 54 for imaging with each imager 52 and 56, optionally with different illumination optics (e.g., a different condenser/objective and/or with and without a diffuser, among others). Accordingly, the same light source may irradiate the samples (and/or the examination region) for trans-illumination location imaging and epi-illumination content imaging. In some embodiments, different light sources may irradiate the samples (and/or the examination region) for respective trans-illumination location imaging and trans-illumination content imaging. The size of an area of specimen plane 62 irradiated may be substantially larger when detecting an image with location imager 52 relative to content imager 56, such as at least 2, 5, 10, or 20 times larger, among others. In some embodiments, a greater number of samples 54 held by sample holder 60 may be irradiated concurrently (and imaged concurrently) while imaging with location imager 52 than with content imager 56. For example, every sample may be irradiated (and imaged) concurrently for location imaging, and only a subset of the samples (e.g., one) may be irradiated (and imaged) concurrently for content imaging. Each light source may be of any suitable type, such as a light-emitting diode(s), a mercury arc lamp, a laser, or the like.

The imaging system may include at least one drive mechanism 66 to drive movement of system components relative to one another. Each drive mechanism may include a motor and, optionally, an encoder to track movement. The encoder may be a rotary encoder or a linear encoder, among others.

The system may incorporate at least one scanning drive mechanism 66 to move stage 58 and the imaging axis of content imager 56 relative to one another. For example, the system may have a stage drive mechanism operatively connected to stage 58, to drive travel of the stage parallel to specimen plane 62, which changes the position of the stage along an x-axis and/or a y-axis. In other embodiments, a drive mechanism may be operatively connected to content imager 56 and/or associated imaging optics, to drive movement of the imaging axis relative to the stage (e.g., to move the content imager parallel to the specimen plane).

The system also may incorporate at least one focusing drive mechanism. In some embodiments, the focusing drive mechanism is operatively connected to an objective (or stage 58) and is configured to move at least a portion of the objective (or the stage) parallel to the imaging axis (e.g., vertically). The system may have at least two focusing drive mechanisms, namely, one to focus location imager 52 and another to focus content imager 56.

The system further may incorporate at least one drive mechanism to move an optical element(s) into and out of an optical path for sample irradiation and/or for light collection for sample imaging. For example, system 50 may have a diffuser 68 that is placed into the optical path by operation of a drive mechanism when a location image is to be detected by location imager 52, and then is removed from the optical path after the location image has been detected and before content imaging is performed. Further aspects of diffuser 68 are described below in Section II. Alternatively, or in addition, the system may have a drive mechanism to change objectives/condensers between location imaging and content imaging, and/or to change the magnification of content imaging.

An optical element may be any device or structure that collects, directs, and/or focuses light and/or at least partially blocks light. An optical element may function by any suitable mechanism, such as reflection, refraction, scattering, diffraction, absorption, and/or filtering, among others. Exemplary optical elements include lenses, mirrors, diffusers, gratings, prisms, filters, apertures, masks, beamsplitters, transmissive fibers (fiber optics), and the like. Each optical element may be dedicated to a single optical path, or shared by two or more optical paths. The optical elements of system 50 may provide any suitable degree of image magnification.

System 50 also may be equipped with a drive mechanism configured as a feeder 70, to automate handling of multiple sample holders (e.g., slides). The feeder may be configured to operatively place each sample holder onto the stage for location/content imaging, and then remove the sample holder after imaging has been completed. Automation and throughput of the system may be increased with the use of the feeder. Further aspects of feeder 70 and its use with a pair of imaging stations is described below in Section III.

System 50 may include a computing system or computer 72. The computer may include a processor 74 (e.g., a digital processor), a display 76, a user interface (UI) 78, a memory to store algorithms and data, and the like. Processor 74 may be in communication with and/or may control operation of any suitable combination of devices of system 50, and may be equipped with any suitable algorithms for automating operation of the system. The processor may receive and process image data from imagers 52, 56 and may control operation of the imagers, such as the timing of image detection by each imager. Processor 74 further may control any or all of the drive mechanisms described above. Control of the drive mechanisms may allow the system to automate imaging of multiple sample holders, and/or multiple samples held by the same sample holder. The processor also may control switching between location imaging and content imaging, different types of content imaging (e.g., epi-illumination and trans-illumination), content imaging of the same type with different levels of magnification, and the like. Further aspects of image collection and image processing that may be controlled by and/or executed by processor 74 are described elsewhere herein, such as in Section V.

Sample 54 may be any suitable material, substance, isolate, extract, particles, or the like of interest. The sample may include biological cells and/or tissue to be imaged. The biological cells may be eukaryotic or prokaryotic, and may be alive or dead (e.g., fixed). Exemplary biological cells include established cells (cell lines), primary cells, cells of a tissue sample, cells from a clinical sample (e.g., a blood sample, a fluid aspirate, a tissue biopsy, etc.), bacterial cells, or the like. The sample may be flat (e.g., a sheet of tissue and/or a layer of cells). The sample may produce a photoluminescent substance (e.g., green fluorescent protein (GFP)) or may be stained with a photoluminescent substance (e.g., after cells have been fixed). The sample also or alternatively may be stained with a dye including a chromophore that absorbs light to give the dye a color.

Sample holder 60 may be any device for holding at least one sample or any array of spatially isolated samples. The sample holder may provide a substrate having at least one horizontal, upward-facing surface region on which biological cells or tissue of a sample may rest and/or be attached. The sample holder may have only one continuous surface region for cell/tissue attachment, or multiple surface regions or compartments that are spatially isolated from one another. Each surface region may include a coating to encourage cell/tissue attachment. The coating may, for example, be poly-lysine, collagen, or the like. The coating may be located on a body of the sample holder, which may be formed of transparent plastic or glass, among others. Exemplary sample holders include slides, culture dishes, multi-well plates (e.g., having 4, 6, 8, 12, 24, 32, 48, or 96 wells, among others), or the like.

II. Optical Configurations for Location Imaging

This section describes exemplary optical configurations in which a light source 64 and location imager 52 of system 50 (FIG. 1) may be arranged to cooperate with one another for location imaging of unstained or stained samples; see FIGS. 2-8.

Figure 2:
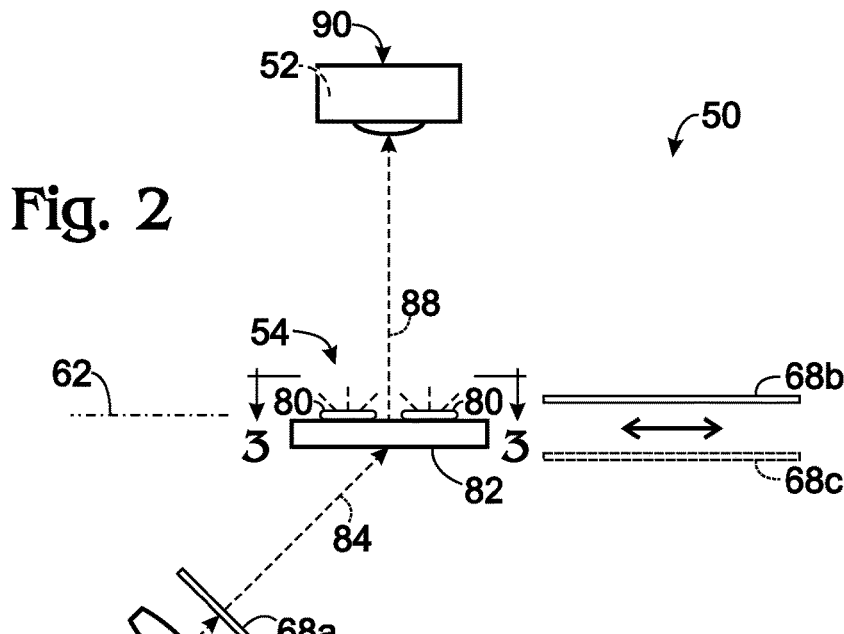
FIG. 2 is a schematic view of an exemplary location imaging configuration for the imaging system of FIG. 1, where the samples are unstained and irradiated obliquely, in accordance with aspects of the present disclosure.

FIG. 2 shows an exemplary trans-illumination configuration for location imaging in which samples 54 are unstained tissue sections 80 held by a slide 82. The tissue sections may be irradiated obliquely from underneath with light produced by light source 64 and traveling on an irradiation axis 84 to sections 80. In the depicted embodiment, irradiation axis 84 is oblique to specimen plane 62. For example, the irradiation axis may form an angle with the specimen plane of about 20 to 70, 30 to 60, 40 to 50, or 45 degrees. Accordingly, light is incident on sections 80 at the same angle. The light may interact with irradiation optics including one or more optical elements between light source 64 and sections 80. For example, the light may pass as a beam through a condenser 86 and/or may be transmitted or reflected by at least one diffuser 68a, which may be located downstream (as shown here) or upstream of the condenser. The diffuser may homogenize the beam of light. The entire sample-supporting area of the slide (or other sample holder) may be irradiated at the same time by the beam of light. The configuration of FIG. 2 (and FIG. 8) can be advantageous because the location images detected have no keystone distortion, but may be more difficult to introduce into an existing imaging system.

Light scattered by sections 80 and/or slide 82 travels on an optical axis 88 from the sections/slide to location imager 52, which may be contained by a camera 90 that includes collection optics, such as an objective. The camera may or may not be mounted externally with respect to the rest of the system. In the depicted embodiment, optical axis 88 is perpendicular to an image plane defined by imager 52. At least one location image may be detected by camera 90. In some embodiments, the location image may be collected while a diffuser 68b or 68c is placed temporarily in the optical path between the light source and the camera, using a drive mechanism described above in Section I. The diffuser(s) may be positioned close to sections 80 in a plane parallel to specimen plane 62, either over the sections (diffuser 68b) and/or under the slide (diffuser 68c). The diffuser may be a thin sheet of material.

Figure 3:
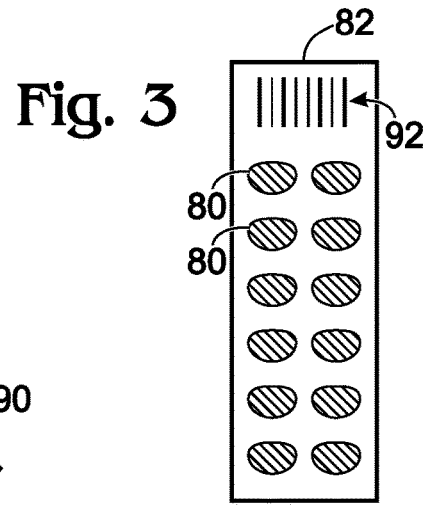
FIG. 3 is a plan view of a slide supporting the unstained samples in FIG. 2 while the slide and samples are irradiated obliquely, taken generally along line 3-3 of FIG. 2, and schematically illustrating optical contrast between the samples and the slide due to more scattering by the samples.

FIG. 3 shows how sections 80 and slide 82 may appear using the configuration of FIG. 2. Sections 80 may forward-scatter incident light to camera 90 more efficiently than slide 82 alone. Accordingly, the sections, even though unstained, may appear brighter in the location image than the slide background surrounding the sections. The slide (or a slide holder) may bear indicia 92, such as a barcode, for identification purposes, to uniquely distinguish the slide, particularly when the system is handling multiple slides automatically. As described in more detail below in Section V, the processor may process the location image to extract identifying information from indicia 92.

Figure 4:
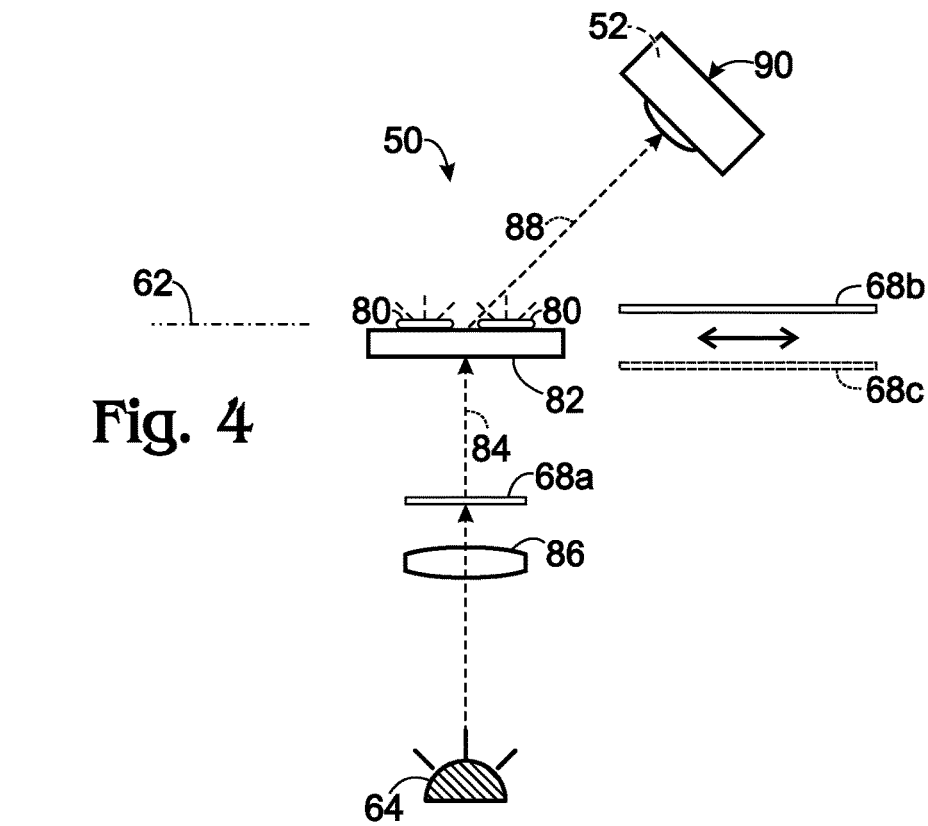
FIG. 4 is a schematic view of another exemplary location imaging configuration for the imaging system of FIG. 1, where the samples are unstained and imaged obliquely, in accordance with aspects of the present disclosure.

FIG. 4 shows another exemplary trans-illumination configuration for location imaging with unstained tissue sections 80 held by a slide 82. The configuration here and other configurations described below may utilize any of the optical elements described above for FIG. 2, such as a condenser and at least one diffuser. The tissue sections may be irradiated orthogonally (or obliquely as in FIG. 2) from underneath by light produced by light source 64. However, light forward-scattered by sections 80 and/or slide 82 travels on an oblique optical axis 88 from the sections to camera 90 for oblique imaging by location imager 52. For example, optical axis 88 or the imaging plane of imager 52 may form an angle of about 20-70, 30-60, 40-50, or 45 degrees with specimen plane 62. As a result, the detected location image of the slide may contain a keystone distortion that makes rectangular objects appear trapezoidal, as described in more detail below in Section V. The configuration of FIG. 4 (or an inverted counterpart thereof) can be advantageous because the camera can be introduced more easily into an existing imaging system, but the presence of keystone distortion may reduce accuracy and/or require more image processing.

FIGS. 5-7 correspond respectively to FIGS. 2-4 except that sections 80 are stained and thus absorb incident light from light source 64 more efficiently than the slide alone. Camera 90 thus detects more forward scattering from regions of the slide that are not covered by sections 80. As a result, in FIG. 6, sections 80 are depicted as darker (unfilled) than the surrounding slide background. Diffusers 68b and/or 68c of FIGS. 2 and 4 may or may not be utilized.

Figure 8:
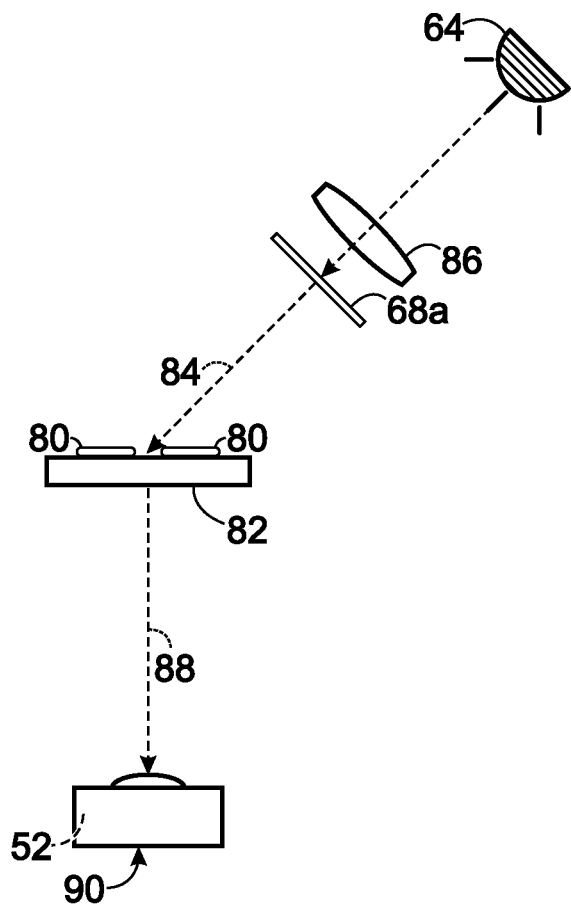
FIG. 8 is a schematic view of yet another exemplary location imaging configuration for the imaging system of FIG. 1, where the samples are irradiated obliquely from above, in accordance with aspects of the present disclosure.

FIG. 8 shows yet another exemplary trans-illumination configuration for location imaging with stained or unstained tissue sections 80 held by a slide 82. The configuration of FIG. 8 is similar to that of FIGS. 2 and 5, except inverted. In other embodiments, the configuration of FIGS. 4 and 7 may be inverted.

III. Imaging System with a Pair of Imaging Stations

Figure 9:
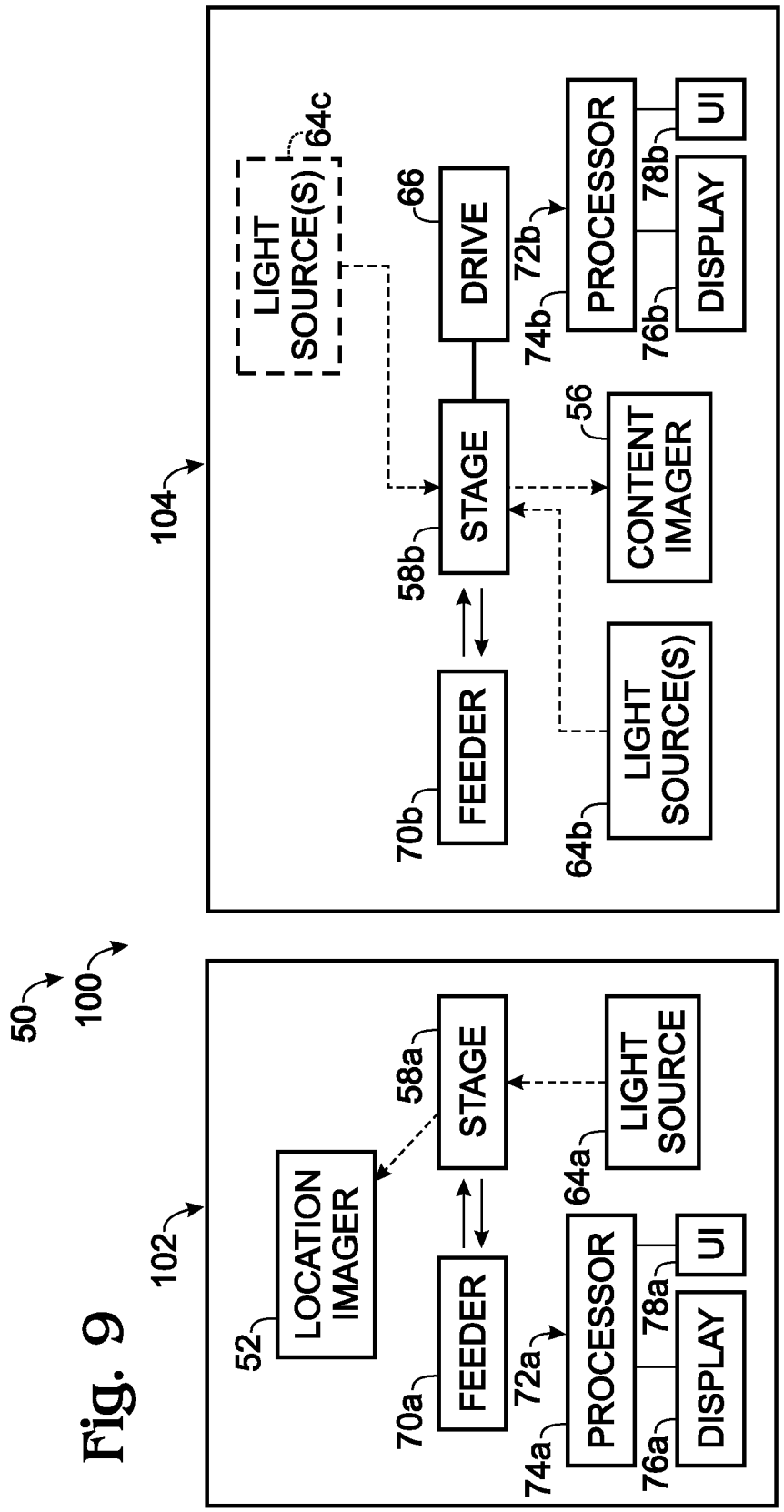
FIG. 9 is a schematic view of an exemplary arrangement of the microscope imaging system of FIG. 1 in which location imaging and primary imaging are performed in different stations, in accordance with aspects of the present disclosure.

This section describes an exemplary system arrangement 100 of imaging system 50 having a location imaging station 102 and a content imaging station 104; see FIG. 9. Arrangement 100 may have any suitable combination of the elements, features, configurations, and algorithms described elsewhere herein, such as in Sections I, II, IV, V, and VI.

System arrangement 100 allows location imaging and content imaging to be performed substantially concurrently at the pair of imaging stations 102, 104. The stations respectively contain location imager 52 and content imager 56. Each station has its own stage 58a or 58b to a support sample holder, light source 64a or 64b (and/or 64c) to irradiate each sample holder and its samples, and feeder 70a or 70b to sequentially place sample holders on the respective stage for imaging. In some embodiments, feeders 70a and 70b may be operatively associated with a robotic handler that transports sample holders between the feeders, or sample holders may be moved between the feeders manually by a user. Each station also may have any suitable drive mechanisms 66 as explained above in Section I, such a drive mechanism in station 104 to move each located sample into the field of view of content imager 56, an automated focusing mechanism, and the like.

Each station may have its own computer 72a or 72b including processor 74a or 74b to control operation of station devices, process image data, and the like. The computers may be in communication with one another via a wired or wireless connection to coordinate station activities and/or to allow sample locations identified by station 102 to be communicated to station 104, for subsequent content imaging of each location in station 104 at higher magnification and/or with a different type of illumination (e.g., epi-illumination to detect photoluminescence). Alternatively, the same computer/processor may run both stations.

IV. Imaging System Embodiment

This section describes an exemplary embodiment 120 of imaging system 50 capable of operating in a location mode (see FIG. 10A), an epi-illumination content mode for photoluminescence imaging (see FIG. 10B), and a trans-illumination content mode for colorimetric imaging (see FIG. 10C).

The configuration and use of system 120 may be modified from that shown. For example, system 120 may have any of the optical configurations for location imaging described above in Section II. Also, system 120 is shown imaging a slide 82 carrying tissue sections 80. However, the system may be configured to image any suitable sample holders and samples as described elsewhere herein.

FIG. 10A shows system 120 while performing location imaging. Sections 80 may be irradiated from below with trans-illumination light ($\lambda_T$) produced by light source 64a and traveling along an irradiation axis 84 from the light source to slide 82. The light may pass through one or more lenses (e.g., lenses 86a and 86b) and may interact with at least one diffuser (e.g., transmissive diffuser 68a). The light may be reflected by a beamsplitter 122 such that axis 84 is folded and the light is incident on sections 80 perpendicular to the specimen plane. Camera 90 may be mounted to obliquely image slide 82 and its supported sections 80 by detecting forward-scattered light to collect a location image.

A pair of cross polarizers 124a, 124b may be disposed in the optical path between the light source and the camera, with polarizer 124a optically upstream of slide 82 and polarizer 124b optically downstream of the slide. The polarizers may be arranged to plane-polarize light transverse to one another (e.g., perpendicular to one another), to reduce background in the location image.

The locations of tissue sections 80 in the location image may be determined with a processor 74 executing steps of an algorithm. The processor then may send a signal to a stage drive mechanism 66 that causes each location/section to be moved into the field of view of content imager 56 (e.g., on the imaging axis thereof), for subsequent content imaging as in FIGS. 10B and/or 10C.

FIG. 10B shows epi-illumination imaging of a tissue section 80 that has been aligned with the imaging axis of content imager 56 by operation of stage drive mechanism 66, indicated by a motion arrow at 126. The section may be irradiated by excitation light ($\lambda_X$) produced by the same light source 64a as in FIG. 10A. However, the optical configuration may be changed to provide more localized irradiation and higher magnification imaging. For example, one or more optical elements may be removed from and/or placed into the irradiation optical path. In the depicted embodiment, lenses 86a and 86b of FIG. 10A are replaced by lens 86c and an objective 86d with a larger numerical aperture, and diffuser 68a and polarizer 124a are removed. Emitted light ($\lambda_M$) produced by irradiation with the excitation light passes through objective 86d and beamsplitter 122 and is incident on content imager 56.

FIG. 10C shows trans-illumination of a tissue section 80 that has been aligned with the imaging axis of content imager 56. The section may be irradiated separately with different wavelengths of light produced by red (R), green (G), and blue (B) light sources 64d, 64e, and 64f. (The section is being irradiated with green light in FIG. 10C.) Content imager 56 may be a grayscale image detector that collects a separate image of the section during irradiation with each light source 64d-64f. Processor 74 then may combine the grayscale images to produce a color image of the tissue section.

V. Methods of Processing Location Images

This section describes exemplary methods of processing location images automatically or with various amounts of user input, optionally followed by collection of content images; see FIGS. 11-16. Any combination of the method steps disclosed in this section or elsewhere herein may be performed by imaging system 50.

FIGS. 11 and 12 relate to calibration of a location imager 52 and optionally a content imager 56 of system 50. This calibration may enable placement, of any given point represented within a location image, on the imaging axis and/or within the field of view of the content imager, such as at a predefined position in the field of view (e.g., at least generally centered). The calibration may map pixels within the location image to absolute or relative physical positions within the specimen plane. The calibration also may correlate the fields of view of the imagers relative to one another and/or may establish an offset in the specimen plane (an xy offset), if any, of the imaging axes of the location and content imagers relative to one another and/or with respect to one or more landmarks.

FIG. 11 shows any exemplary calibration member 140, which is structured to be operatively supported by the stage of the imaging system for imaging by the location imager, in order to calibrate (or re-calibrate) the location imager. The calibration member may be utilized before the imaging system is shipped to a user, or may be utilized by the user or a service technician. Member 140 may be sized and shaped like a sample holder; in the depicted embodiment, member 140 is a calibration slide. The calibration member may have reference marks with a defined spacing from one another in a horizontal plane. Here, the reference marks include an array of lines 142 forming a rectangular grid. The lines may or may not have a uniform spacing from one another along the x- and y-axes. For example, the lines may be spaced from one another by an integral number of millimeters, such as 1, 2, 3, 4, 5 or 10 millimeters, among others. In some embodiments, the lines may be replaced by or supplemented with other types of reference marks, such as dots 144, dashes, geometrical shapes, alphanumeric characters, other symbols, or the like.

The calibration member may be imaged parallel (e.g., as in FIG. 5) or obliquely (e.g., as in FIG. 7) to the specimen plane. FIG. 12 shows an exemplary calibration image 150 detected obliquely with the location imager of the imaging system. In FIG. 12 and elsewhere herein, an image counterpart of a physical element or feature is identified with the same reference number, but with an appended "i" (for image). To simplify the discussion, calibration member 140 has been imaged while located in the center of the location imager's field of view, with central dot 144 positioned on the imaging axis of the imager. However, because calibration member 140 has been imaged obliquely by the location imager, calibration member 140i in image 150 exhibits a keystone distortion that converts the rectangular shape of physical calibration member 140 to trapezoidal for its image counterpart. The rectangular grid formed by lines 142 on calibration member 140 is visible as lines 142i, but the imaged lines no longer form a rectangular grid. Nevertheless, each of the pixels of image 150 can be mapped to physical space by interpolation or extrapolation using the known physical separation between lines 142 (or other reference marks) on member 140 in physical space and an algorithmically determined pixel separation between lines 142*i* in the image.

In some embodiments, a keystone correction may be applied to the calibration image. The keystone correction, in this case, would process the image to remove the distortion of calibration member 140*i*, such that the member and the grid formed by lines 142*i* are rectangular instead of trapezoidal. The same keystone correction that removes the distortion in the calibration image can be applied to location images detected obliquely.

The relationship between the imaging axes and/or fields of view of location imager 52 and content imager 56 may be determined. This relationship may, for example, be determined by imaging calibration member 140 with both imagers. An exemplary field of view 152*i* for the content imager is shown dashed within location image 150 of FIG. 12, although an image of member 140 detected by the content imager generally has no substantial keystone distortion. The physical location of field of view 152*i* and the imaging axis at its center may, in the depicted embodiment, be determined by identifying the position of one or more reference marks 142 and a dot 144 within an image detected by the content imager.

A scanning drive mechanism (e.g., a stage drive mechanism) of the imaging system also may be calibrated by any suitable method to provide accurate displacement of a sample and the imaging axis of the content imager relative to one another in response to a control signal from the processor of the imaging system. The control signal can correspond to a desired physical distance that the stage or imaging axis needs to move to provide net displacement along an x-axis and/or a y-axis, which may place a suitable region of a sample holder or sample in the field of view of the content imager. The physical distance that the stage or imaging axis needs to move may be calculated. The processor may keep track of the current position of the stage or imaging axis in the specimen plane each time the stage or imaging axis is moved. For example, the current offset of the stage or imaging axis from an origin or "home" position may be determined. Pixels in a calibration image detected by the location imager (and/or content imager) also may be mapped with respect to the origin or home position. As described in more detail below, the difference between the expected and actual positions of a landmark in a location image may be compared to correct for errors in the tracked position of the stage or imaging axis.

The scanning drive mechanism may be operated to move one or more sample regions identified in a location image, into the field of view of the content imager. The current offset of the sample region from a target position in the field of view may be calculated. The offset may, for example, be calculated first as a pixel offset of the sample region along image x- and y-axes, which then may be converted to a physical offset in the specimen plane. A suitable control signal of the scanning drive mechanism to eliminate this physical offset may be determined and communicated to the drive mechanism.

Figure 13:
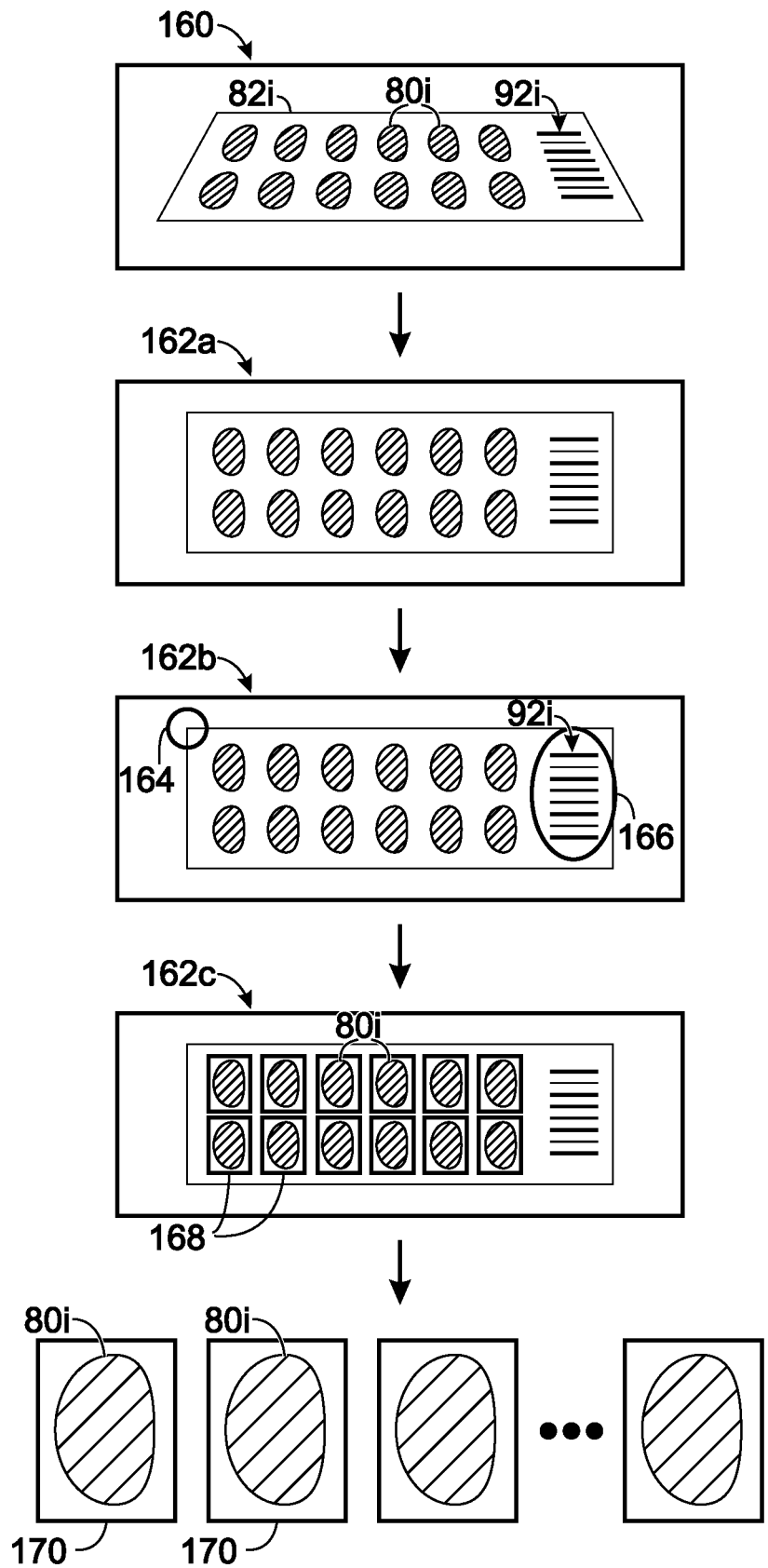
FIG. 13 is a schematic representation of an exemplary set of steps that may be performed autonomously by the microscope imaging system of FIG. 1, including processing a location image to locate samples, and imaging the located samples with a content imager of the system, in accordance with aspects of the present disclosure.

FIG. 13 schematically illustrates an exemplary set of steps that may be performed autonomously by the microscope imaging system of FIG. 1. (The terms "autonomously" and "automatically" are used interchangeably herein and describe activities performed without the intervention of a user.) A location image 160 may be detected obliquely (or parallel) by a calibrated location imager. The image may include samples (e.g., sections 80*i*) supported by a sample holder (e.g., a slide 82*i*).

Location image 160 may (or may not) be processed to create a keystone-corrected location image 162*a* in which keystone distortion has been removed. Before or after this processing step, features in the location image may be identified by one or more feature-finding algorithms (see images 162*b* and 162*c*). Each algorithm may identify features in any suitable order based on contrast within the image and one or more parameters that characterize a feature.

The features may include a landmark 164 created in the image by the sample holder and/or the stage (see image 162*b*). In the depicted embodiment, the landmark is a transparent corner of the sample holder that is interfaced and contrasts with an opaque mount (not shown) of the stage that engages the corner. The landmark may have a known xy position in the frame of reference of the imaging system, and a known xy offset, if any, in physical space (and/or in images), from the imaging axis of each imager. Accordingly, because the location imager has been calibrated, as described above, the xy offset in physical space of the landmark from any given pixel in the location image is known.

The features also may include indicia 92*i* (see image 162*b*). The indicia may be read from the location image, indicated at 166, to identify the sample holder and/or its samples. In some embodiments, a unique identifier obtained from the indicia may be associated by the processor with each content image detected subsequently from the sample holder. In some embodiments, the indicia may inform the processor that a particular protocol for image processing should be followed.

The features also may include regions of contrast 168 produced by samples (see image 162*c*). Each contrast region may include at least part of a tissue section 80*i* or other sample). In image 162*c*, each contrast region 168 selected by the processor is sized according to the field of view of the content imager. (The collection optics for the content imager may be adjustable to provide different magnifications and thus different sizes of the field of view.) Accordingly, each contrast region 168 may or may not be completely filled with a sample. In the present illustration, the field of view of the content imager is larger than each section 80*i*, such that the section is surrounded by a sample-free border in each contrast region 168 selected by the processor. In some embodiments, the processor may select only a point (e.g., a center point) for each contrast region 168, with the point corresponding to a desired position for the imaging axis of the content imager to detect the contrast region.

Images 170 then may be collected serially by the content imager of the system for each of contrast regions 168 identified in image 162*c*. Each image 170 may contain at least part of a tissue section 80*i* or other sample that produces contrast in image 162*c*.

A region of contrast may be identified by any suitable algorithm using any suitable parameters. The region of contrast may be any area of an image having at least a threshold level of contrast relative to background and/or at least a threshold size (or falling within a predefined size range).

FIG. 14 schematically illustrates a version of the method of FIG. 13 that utilizes user input. A location image 180 may be collected and, optionally, corrected for keystone distortion. The processor may automatically identify regions of contrast 168. Image 180*a* may be displayed to a user with each region of contrast delineated (e.g., with a rectangle placed around each region as shown) or marked otherwise. The processor then may receive user input, via a user interface (such as a mouse or touchscreen, among others), selecting each region of contrast 168 that is of interest to the user. This selection is illustrated schematically in image 180a with a crosshair cursor positioned over undamaged sections 182 but not damaged sections 184, which may be of less interest to the user. The processor then controls collection of images 170 according to the contrast regions (and thus samples) selected by the user.

FIG. 15 schematically illustrates another version of the method of FIG. 13 that utilizes user input. A location image 190 may be collected and, optionally, corrected for keystone distortion. The location image may be displayed to a user without any region of contrast marked. The processor then may receive user input, via a user interface, selecting points of interest 192 within image 190a. Each point of interest may be contained within a contrast region 168 that would be identified by the processor automatically. This selection is illustrated schematically in image 190 with a crosshair cursor placed over undamaged sections, indicated at 192. The processor then defines a region of contrast 168 that corresponds to each point of interest 192 selected by the user (see image 190a), and controls collection of content images 170 corresponding to regions 168.

FIG. 16 schematically illustrates yet another version of the method of FIG. 13 that utilizes user input. A location image 200 is detected and displayed to a user. The user then places boxes 202 around regions of interest. The processor controls detection of content images 170 corresponding to the boxes. In some embodiments, the processor may create boxes sized to correspond to the field of view of the content imager, and then the user may move each box to a desired region of the image. In some embodiments, the user may draw a box around each region of interest, and the processor may control detection of a content image 170 centered on the region of interest.

VI. EXAMPLES

The following examples describe selected aspects and embodiments of the present disclosure related to a microscope imaging system having a location imager and a content imager. These examples are included for illustration and are not intended to limit or define the entire scope of the present disclosure.

Example 1. Location Image Data

Figure 17:
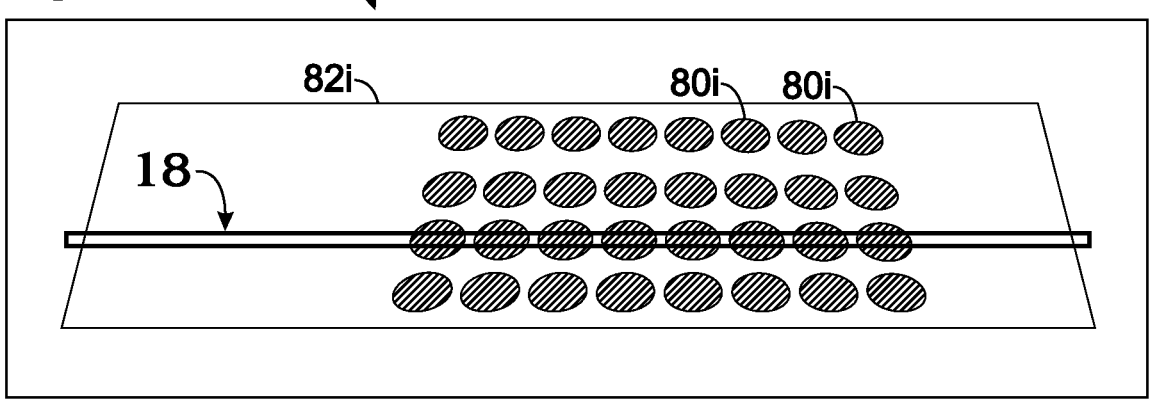
FIG. 17 is a schematic view of a location image collected with a working embodiment of the microscope imaging system of FIG. 1 having the location imaging configuration of FIG. 4.
Figure 18:
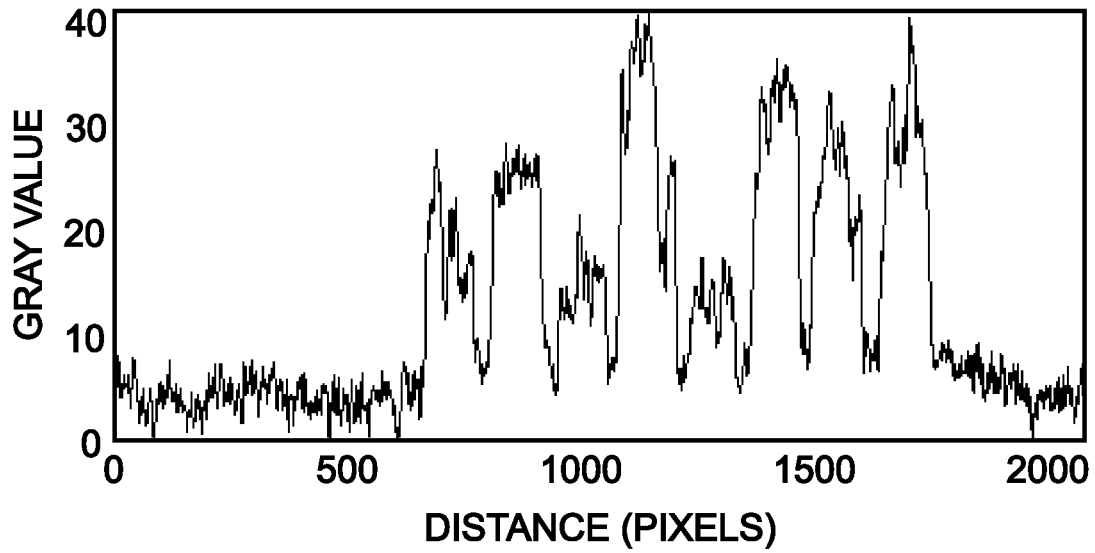
FIG. 18 is a graph of pixel gray values obtained from a region of the location image of FIG. 17, with the region indicated generally at "18" in FIG. 17.

This example describes a location image collected with a working embodiment of imaging system 50; see FIGS. 17 and 18.

FIG. 17 shows a location image 210 collected with an embodiment of the microscope imaging system of FIG. 1 having the location imaging configuration of FIG. 4. A slide 82i and tissue sections 80i are visible in image 210.

FIG. 18 shows a graph of pixel gray values obtained from a rectangular region of location image 210. The processor of the system can identify the location of tissue sections using an algorithm that detects regions of contrast exceeding a threshold level of contrast size and size.

Example 2. Selected Embodiments

This example describes selected embodiments of the present disclosure as a series of indexed paragraphs.

Paragraph 1. An imaging system, comprising: (A) a light source to irradiate a sample on an irradiation axis; (B) a first imager mounted to receive light from the irradiated sample on an optical axis oblique to the irradiation axis; (C) a stage to support the sample; (D) a second imager disposed on an imaging axis; (E) a drive mechanism configured to move the stage and the imaging axis relative to one another; and (F) a processor configured to (i) receive an image of the sample detected by the first imager, (ii) determine a physical location for a region of contrast produced by the sample within the image, and (iii) send a signal to the drive mechanism based on the physical location, to dispose at least part of the sample in a field of view of the second imager.

Paragraph 2. The imaging system of paragraph 1, wherein the first imager is configured to image the sample obliquely.

Paragraph 3. The imaging system of paragraph 2, wherein the processor is configured to make a keystone correction to the image detected by the first imager.

Paragraph 4. The imaging system of paragraph 3, wherein the processor is configured to display the image to a user after making the keystone correction.

Paragraph 5. The imaging system of any of paragraphs 1 to 4, wherein the same light source is configured to irradiate the sample when each of the first and second imagers detects an image.

Paragraph 6. The imaging system of any of paragraphs 1 to 5, wherein the stage is configured to support the sample in a horizontal specimen plane, and wherein the first and second imagers are disposed on opposite sides of the specimen plane from one another.

Paragraph 7. The imaging system of any of paragraphs 1 to 6, wherein the imaging system is configured to detect an epi-photoluminescence image and/or a trans-illumination image with the second imager.

Paragraph 8. The imaging system of any of paragraphs 1 to 7, wherein the processor is configured to determine the physical location of the region of contrast based at least in part on a predetermined relationship between pixels of the image and position in a plane of physical space.

Paragraph 9. The imaging system of any of paragraphs 1 to 8, further comprising a diffuser positioned or positionable in an optical path from the light source to the first imager.

Paragraph 10. The imaging system of any of paragraphs 1 to 9, wherein the first imager is configured to detect the sample at lower magnification than the second imager.

Paragraph 11. The imaging system of any of paragraphs 1 to 10, further comprising a diffuser positionable in an optical path from the light source to the first imager, wherein the processor is configured to cause the diffuser to be moved into the optical path such that the diffuser is in the optical path when the first imager detects an image, and to be moved out of the optical path such that the diffuser is not in the optical path when the second imager detects an image.

Paragraph 12. The imaging system of any of paragraphs 1 to 11, wherein the processor is configured to process the image detected by the first imager to identify a sample-independent landmark within the image.

Paragraph 13. The imaging system of any of paragraphs 1 to 12, wherein the processor is configured to signal the second imager to detect an image when the at least part of the sample is disposed in the field of view of the second imager.

Paragraph 14. The imaging system of any of paragraphs 1 to 13, wherein the processor is configured to display at least a portion of the image detected by the first imager such that the region of contrast is marked, and to receive an input from a user selecting the marked region of contrast for imaging with the second imager.

Paragraph 15. The imaging system of any of paragraphs 1 to 14, wherein the processor is configured to display at least a portion of the image detected by the first imager to a user, to receive an input from the user selecting a site within the image, and to identify the region of contrast based on the site selected.

Paragraph 16. The imaging system of any of paragraphs 1 to 15, further comprising an external camera including the first imager and integrated optics.

Paragraph 17. The imaging system of any of paragraphs 1 to 16, wherein the irradiation axis is vertical.

Paragraph 18. The imaging system of any of paragraphs 1 to 16, the light source being a first light source, further comprising a second light source configured to irradiate the sample, wherein the second light source and the second imager are disposed on the same side of a specimen plane of the imaging system.

Paragraph 19. The imaging system of any of paragraphs 1 to 18, wherein the imaging system includes a first stage and a second stage, wherein the first imager is operatively mounted to image a sample when supported by the first stage, and wherein the second imager is configured to image a sample when supported by the second stage.

Paragraph 20. The imaging system of any of paragraphs 1 to 19, wherein the imaging system is configured to detect a trans-illumination image with the second imager.

Paragraph 21. A method of imaging, the method comprising: (A) irradiating a sample with light on an irradiation axis; (B) detecting a first image with a first imager receiving light from the irradiated sample on an optical axis oblique to the irradiation axis; (C) processing the first image to determine a physical location for a region of contrast produced by the sample within the image; (D) moving the sample and the second imager relative to one another based on the physical location, to dispose at least part of the sample in a field of view of the second imager; and (E) detecting a second image with the second imager.

Paragraph 22. The method of paragraph 21, wherein the step of detecting a first image includes a step of imaging the sample obliquely with the first imager.

Paragraph 23. The method of paragraph 22, further comprising a step of making a keystone correction to the first image detected by the first imager.

Paragraph 24. The method of paragraph 23, further comprising a step of displaying the first image after making the keystone correction.

Paragraph 25. The method of any of paragraphs 21 to 24, wherein the same light source irradiates the sample when each of the first and second imagers detects an image.

Paragraph 26. The method of any of paragraphs 21 to 25, wherein the sample is supported in a horizontal specimen plane during the step of detecting a first image, and wherein the first and second imagers are disposed on opposite sides of the specimen plane from one another.

Paragraph 27. The method of any of paragraphs 21 to 26, wherein the step of irradiating includes a step of irradiating a slide supporting tissue sections, and wherein the step of detecting an image includes a step of detecting an image of a majority of the slide by area.

Paragraph 28. The method of any of paragraphs 21 to 27, further comprising a step of calculating an offset of the physical location, wherein the step of moving is based on the offset, and wherein the step of calculating an offset is based at least in part on a predetermined relationship between pixels of the image and position in a plane of physical space.

Paragraph 29. The method of any of paragraphs 21 to 28, further comprising a step of autonomously identifying the region of contrast within the first image with a processor.

Paragraph 30. The method of any of paragraphs 21 to 29, wherein the step of detecting a second image includes a step of detecting a second image at a higher magnification than the first image.

Paragraph 31. The method of any of paragraphs 21 to 30, further comprising a step of processing the first image to identify a sample-independent landmark within the first image.

Paragraph 32. The method of any of paragraphs 21 to 31, further comprising a step of autonomously selecting the region of contrast with a processor for imaging by the second imager.

Paragraph 33. The method of any of paragraphs 21 to 32, further comprising a step of displaying at least a portion of the first image, with the region of contrast marked, and a step of receiving an input from a user selecting the marked region of contrast for imaging with the second imager.

Paragraph 34. The method of any of paragraphs 21 to 33, further comprising a step of displaying at least a portion of the first image to a user, a step of receiving input from the user selecting a site within the first image, and a step of identifying the region of contrast based on the site selected.

Paragraph 35. The method of any of paragraphs 21 to 34, further comprising a step of automatically moving a diffuser into an optical path between the light source and the first imager.

Paragraph 36. The method of paragraph 35, wherein the step of automatically moving a diffuser includes a step of moving the diffuser into the optical path before the step of detecting a first image with a first imager, further comprising a step of moving the diffuser out of the optical path after the step of detecting a first image with the first imager, such that the diffuser is not in the optical path when the step of detecting a second image is performed.

Paragraph 37. The method of any of paragraphs 21 to 36, wherein the step of irradiating a sample and the step of detecting a first image are performed with the sample supported by a first stage, and wherein the step of moving the sample and the step of detecting a second image are performed with the sample supported by a second stage, further comprising a step of transferring the sample from the first stage to the second stage.

Paragraph 38. The method of any of paragraphs 21 to 37, wherein the step of detecting a second image includes a step of detecting an epi-photoluminescence image with the second imager.

Paragraph 39. The method of any of paragraphs 21 to 38, wherein the step of detecting a second image includes a step of detecting a trans-illumination image with the second imager.

The term "about," as used herein with respect to a value, means within 10% of the stated value. For example, a dimension described as being "about 10" means that the dimension is greater than 9 and less than 11.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure. Further, ordinal indicators, such as first, second, or third, for identified elements are used to distinguish between the elements, and do not indicate a particular position or order of such elements, unless otherwise specifically stated.

What is claimed is:

1. An imaging system for trans-illumination of a sample, comprising:
    a light source to irradiate through the sample comprising biological cells on an irradiation axis, the light passing through the sample, and the light source being located on a first side with respect to the sample, wherein the sample is at least one of unstained or stained with a photoluminescent substance;
    a first image detector mounted to receive light from the irradiated sample on an optical axis oblique to the irradiation axis, the first image detector being located on a second side with respect to the sample, the second side being opposite to the first side;
    a stage to support the sample;
    a second image detector disposed on an imaging axis;
    a drive mechanism configured to move the stage and the imaging axis relative to one another; and
    a processor configured to (a) receive an image of the sample detected by the first image detector, (b) determine a physical location for a region of contrast produced by the sample within the image, and (c) send a signal to the drive mechanism based on the physical location, to dispose at least part of the sample in a field of view of the second image detector.

2. The imaging system of claim 1, wherein the first image detector is configured to image the sample obliquely.

3. The imaging system of claim 2, wherein the processor is configured to make a keystone correction to the image detected by the first image detector.

4. The imaging system of claim 3, wherein the processor is configured to display the image to a user after making the keystone correction.

5. The imaging system of claim 1, wherein the same light source is configured to irradiate the sample when each of the first and second image detectors detects an image.

6. The imaging system of claim 1, wherein the stage is configured to support the sample in a horizontal specimen plane, and wherein the first and second image detectors are disposed on opposite sides of the specimen plane from one another.

7. The imaging system of claim 1, wherein the imaging system is configured to detect an epi-photoluminescence image and/or a trans-illumination image with the second image detector.

8. The imaging system of claim 1, wherein the processor is configured to determine the physical location of the region of contrast based at least in part on a predetermined relationship between pixels of the image and position in a plane of physical space.

9. The imaging system of claim 1, further comprising a diffuser positioned or positionable in an optical path from the light source to the first image detector.

10. The imaging system of claim 1, wherein the first image detector is configured to detect the sample at lower magnification than the second image detector.

11. A method of trans-illumination imaging, the method comprising:
    irradiating through a sample using a light source comprising biological cells with light on an irradiation axis, the light source being located on a first side with respect to the sample, wherein the sample is at least one of unstained or stained with a photoluminescent substance;
    detecting a first image with a first image detector receiving light from the irradiated sample on an optical axis oblique to the irradiation axis, the first image detector being located on a second side with respect to the sample, the second side being opposite to the first side;
    processing the first image to determine a physical location for a region of contrast produced by the sample within the first image;
    moving the sample and the second image detector relative to one another based on the physical location, to dispose at least part of the sample in a field of view of the second image detector; and
    detecting a second image with the second image detector.

12. The method of claim 11, wherein the step of detecting a first image includes a step of imaging the sample obliquely with the first image detector.

13. The method of claim 12, further comprising a step of making a keystone correction to the first image detected by the first image detector.

14. The method of claim 13, further comprising a step of displaying the first image after making the keystone correction.

15. The method of claim 11, wherein the same light source irradiates the sample when each of the first and second image detectors detects an image.

16. The method of claim 11, wherein the sample is supported in a horizontal specimen plane during the step of detecting a first image, and wherein the first and second image detectors are disposed on opposite sides of the specimen plane from one another.

17. The method of claim 11, wherein the step of irradiating includes a step of irradiating a slide supporting tissue sections, and wherein the step of detecting a first image includes a step of detecting an image representing a majority of the slide.

18. The method of claim 11, further comprising a step of calculating an offset of the physical location, wherein the step of moving is based on the offset, and wherein the step of calculating an offset is based at least in part on a predetermined relationship between pixels of the first image and position in a plane of physical space.

19. The method of claim 11, further comprising a step of autonomously identifying the region of contrast within the first image with a processor.

20. The method of claim 11, wherein the step of detecting a second image includes a step of detecting a second image at a higher magnification than the first image.

* * * * *